(12) United States Patent
Wishart

(10) Patent No.: US 11,453,286 B2
(45) Date of Patent: Sep. 27, 2022

(54) HYBRID VEHICLE COUNTER-ROTATING MOTOR ADAPTED DRIVELINE AND RETRO-FIT SYSTEM

(71) Applicant: CR FLIGHT, LLC, Carmichael, CA (US)

(72) Inventor: Randell J. Wishart, Reno, NV (US)

(73) Assignee: CR FLIGHT L.L.C., Carmichael, CA (US)

( * ) Notice: Subject to any disclaimer, the term of this patent is extended or adjusted under 35 U.S.C. 154(b) by 229 days.

(21) Appl. No.: 16/925,808

(22) Filed: Jul. 10, 2020

(65) Prior Publication Data

US 2021/0001702 A1 Jan. 7, 2021

Related U.S. Application Data

(63) Continuation of application No. PCT/US2019/014594, filed on Jan. 22, 2019.

(60) Provisional application No. 62/709,612, filed on Jan. 23, 2018.

(51) Int. Cl.

| *B60K 6/26* | (2007.10) |
|---|---|
| *B60K 26/02* | (2006.01) |
| *B60K 6/24* | (2007.10) |
| *B60K 6/40* | (2007.10) |
| *H02K 7/00* | (2006.01) |
| *B60K 6/28* | (2007.10) |

(52) U.S. Cl.
CPC .............. *B60K 6/26* (2013.01); *B60K 6/24* (2013.01); *B60K 6/40* (2013.01); *B60K 26/02* (2013.01); *H02K 7/006* (2013.01); *B60K 6/28* (2013.01); *B60K 2006/262* (2013.01); *B60K 2026/025* (2013.01); *B60Y 2200/92* (2013.01)

(58) Field of Classification Search
CPC ... B60K 6/26; B60K 6/24; B60K 6/40; B60K 6/28; B60K 26/02; B60K 2006/262; B60K 2026/025; H02K 7/006; B60Y 2200/92
See application file for complete search history.

(56) References Cited

U.S. PATENT DOCUMENTS

| 2,431,255 A | 11/1947 | Jenkins |
|---|---|---|
| 2,456,993 A | 12/1948 | Rambo |
| 2,462,182 A | 2/1949 | Guerdan |
| 2,833,996 A | 5/1958 | Whicker |
| 3,738,270 A | 6/1973 | Hargett |
| 4,056,746 A | 11/1977 | Burtis |

(Continued)

FOREIGN PATENT DOCUMENTS

| CN | 1771636 A | 5/2006 |
|---|---|---|
| CN | 103659129 A | 3/2014 |

(Continued)

OTHER PUBLICATIONS

ISA/US, United States Patent and Trademark Office (USPTO), International Search Report and Written Opinion dated Feb. 12, 2018, related PCT international application No. PCT/US2017/064551, pp. 1-8, claims searched, pp. 9-14.

(Continued)

*Primary Examiner* — John D Walters
(74) *Attorney, Agent, or Firm* — O'Banion & Ritchey LLP; James M. Ritchey

(57) ABSTRACT

New and retro-fit systems utilized on a chemical fuel-powered vehicle that converts the vehicle into a hybrid chemical fuel-electric vehicle.

9 Claims, 2 Drawing Sheets

(56) References Cited

U.S. PATENT DOCUMENTS

| | | | |
|---|---|---|---|
| 4,259,604 A | | 3/1981 | Aoki |
| 4,375,047 A | | 2/1983 | Nelson |
| 4,645,963 A | | 2/1987 | Plackner |
| 4,938,700 A | | 7/1990 | Campbell |
| 5,067,932 A | | 11/1991 | Edwards |
| 5,089,734 A | | 2/1992 | Bickraj |
| 5,470,236 A | | 11/1995 | Wissler |
| 6,433,451 B1 | * | 8/2002 | Cherciu .............. H02K 16/005 266/143 |
| 8,198,773 B2 | | 6/2012 | Wishart |
| 8,253,294 B1 | | 8/2012 | Wishart |
| 8,531,072 B2 | | 9/2013 | Wishart |
| 9,387,756 B1 | * | 7/2016 | Whiting ................ F16H 48/06 |
| 9,561,719 B2 | * | 2/2017 | Lo ............................ B60L 50/15 |
| 10,116,187 B1 | | 10/2018 | Wishart |
| 2002/0190598 A1 | * | 12/2002 | Bartman ................ H01R 39/12 310/219 |
| 2006/0163963 A1 | | 7/2006 | Flores, Jr. |
| 2010/0113202 A1 | | 5/2010 | Treichel |
| 2010/0236849 A1 | * | 9/2010 | Wishart .............. B60K 7/0007 310/115 |
| 2011/0177900 A1 | | 7/2011 | Simon |
| 2011/0259657 A1 | * | 10/2011 | Fuechtner ............ B60K 7/0007 903/902 |
| 2012/0206004 A1 | | 8/2012 | Wishart |
| 2016/0052382 A1 | | 2/2016 | Clark |
| 2016/0207522 A1 | | 7/2016 | Pandit |
| 2016/0244157 A1 | | 8/2016 | Welsh |

FOREIGN PATENT DOCUMENTS

| | | |
|---|---|---|
| CN | 104332794 A | 2/2015 |
| CN | 104505682 A | 4/2015 |
| JP | 2006177375 A | 7/2006 |
| WO | 2018106611 A1 | 6/2018 |
| WO | 2019147587 | 8/2019 |
| WO | 2019147588 | 8/2019 |

OTHER PUBLICATIONS

State Intellectual Property Office of People's Republic of China (SIPO), The First Office Action, dated Apr. 15, 2020, related Chinese patent application No. 201780072941.8, pp. 1-6, English-language translation, pp. 7-11, claims examined, pp. 12-17.

ISA/KR, Korean Intellectual Property Office (KIPO), International Search Report and Written Opinion dated May 1, 2019, related PCT international application No. PCT/US2019/014594, pp. 1-11, claims searched, pp. 12-13.

ISA/KR, Korean Intellectual Property Office (KIPO), International Search Report and Written Opinion dated May 8, 2019, related PCT international application No. PCT/US2019/014593, pp. 1-10, claims searched, pp. 11-17.

State Intellectual Property Office of People's Republic of China (SIPO), The Second Office Action, dated Jun. 16, 2020, related Chinese patent application No. 201780072941.8, pp. 1-3, English-language translation, pp. 4-8, claims examined, pp. 9-15.

* cited by examiner

HYBRID VEHICLE COUNTER-ROTATING MOTOR ADAPTED DRIVELINE AND RETRO-FIT SYSTEM

CROSS-REFERENCE TO RELATED APPLICATIONS

This application claims priority to, and is a 35 U.S.C. § 111(a) continuation of, PCT international application number PCT/US2019/014594 filed on Jan. 22, 2019, incorporated herein by reference in its entirety, which claims priority to, and the benefit of, U.S. provisional patent application Ser. No. 62/709,612 filed on Jan. 23, 2018, incorporated herein by reference in its entirety. Priority is claimed to each of the foregoing applications.

The above-referenced PCT international application was published as PCT International Publication No. WO 2019/147588 on Aug. 1, 2019, which publication is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The subject invention relates to new and retro-fit systems utilized on a chemical fuel-powered vehicle that converts the vehicle into a hybrid chemical fuel-electric vehicle. For the sake of convenience and not by way of limitation, when the term chemical fuel is utilized it will be assumed that gasoline, diesel, ethanol, hydrogen, and equivalent fuels are within the realm of this disclosure. The subject system incorporates into new and existing vehicles an improved efficiency electric motor that is termed a "counter-rotating electric motor" that comprises a counter-rotating electric motor suspended between first and second support bearings, wherein the first support bearing is rotationally secured about an armature shaft attached to and extending from an armature of the motor and the second support bearing is rotationally secured about a stator shaft attached to and extending from a stator of the motor. The counter-rotating motor accesses torsional forces normally lost by utilizing traditional motor mounts that prevent the stator from rotating and provides a higher efficiency motor than traditional motors, in terms of a higher efficiency for the ratio of mechanical power output Po to electric power input Pi (i.e.: the (Po/Pi)×100=% efficiency value is increased for the counter-rotating motor system, in addition to total torque output). Additionally, a unique counter-rotating electric motor encircled driveline is employed to couple electric force into the vehicle's power-train or transfer electric force from the vehicle's power-train. The counter-rotating motor may contain brushes or be brushless (the exemplary embodiment described in detail below is for a brushless counter-rotating motor, but an equivalent brush-containing counter-rotating motor is considered to be within the realm of this disclosure).

2. Background Discussion

The benefits and dramatic mileage improvement of hybrid vehicles over traditional gasoline vehicles are well established. New hybrid vehicles may be adapted with the subject counter-rotating motor invention, however, for a consumer to buy a new hybrid vehicle the purchase is relatively expensive. In terms of simple monetary savings for merely the increased fuel economy, to buy a new hybrid vehicle would not, normally, be cost effective if you already own a good/functioning vehicle since the loss in cash value of trading in the otherwise good vehicle and all of the related added costs of buying the new vehicle would require a very long time to recoup in fuel savings. Thus, the subject invention may be utilized with both new and old vehicles.

For a traditional brush-containing DC motor, the outside/surrounding motor housing is stationary, as is the stator/field magnets within the housing. Normally, the stator is usually affixed to the housing. An internal armature/rotor is attached to a shaft or axle that rotates during operation (in some versions of a standard motor the rotor may be termed the armature). Thus, the armature shaft/axle extends out from the stationary motor housing and rotates when electrical current is applied to the motor (the armature/rotor rotates within the stationary stator/field magnets). In brush-containing motors, physical brushes are required to transmit the electricity from the outside source to the rotor via a commutator interfacing that pulses the current to alternate the field polarity in the coils of the armature, thereby generating the rotational driving force used to turn the armature. The history of traditional brush-containing electric motors is extensive and one version is found at www.sparkmuseum.com/MOTORS.HTM.

For a traditional brushless DC motor, the outside/surrounding motor housing is, again, stationary, as is the stator within the housing. Normally, the stator is usually affixed to the housing. An internal armature/rotor is attached to a shaft or axle that rotates during operation. Thus, the armature shaft/axle extends out from the stationary motor housing and rotates when electrical current is applied to the motor (the armature/rotor rotates within the stationary stator/field magnets). In brushless motors, physical brushes are not required to transmit the electricity from the outside source to the rotor. The configuration of brushless motors permits either a design utilizing permanent magnets affixed to the stator or, more commonly, the permanent magnets are associated with the armature and the field windings are located in the stationary stator. Clearly, brushless motors do not use physical brushes for commutation; instead, they are electronically commutated by standard techniques. To produce rotational movement, suitably pulsed currents are delivered to the windings and timed via incorporated means such as the application of standard Hall Effect sensors/magnets, back emf, and equivalent means. Brushless DC motors have many well-known advantages over brush-containing motors.

Even though an extremely limited number of specialty counter-rotating brush-containing DC motors are described in published patents (see immediately below), it is stressed that no references have been discovered that utilize, suggest, hint, teach, or imply a counter-rotating electric DC motor that operates via a brushless technology in which both the armature (inner rotational member) and the stator (outer rotational member) physically rotate in opposite directions while maintaining continuous electrical contact with exterior control and power elements.

A counter-rotating electric DC motor is described in related U.S. Pat. Nos. 2,431,255, 2,456,993, and 2,462,182. The disclosed motor was to be used in torpedo propulsion systems in which a coaxial propeller assembly drove separate propellers in opposite directions to aid in keeping the torpedo traveling in a desired direction. Clearly, the operational lifetime of such a motor is extremely limited, given its destruction upon hitting a target. To eliminate necessary centrifugal/centripetal influenced commutator-to-brush contact breaks created while the stator is rotating (normally the stator is not rotating so a constant resilient means or spring simply forces a brush inward and towards the center of rotation, thereby contacting the commutator for the required electrical communication, but rotation of the stator causes the brushes to "float" away from the commutator), the device contained a "radial commutator" (a disk extending outwardly from the axis of rotation) and contact brushes directed parallel to the axis of rotation. This radial commutator/brush design is complex, not easily fabricated, and, thus, expensive to manufacture.

In U.S. Pat. No. 3,738,270 a brushless electric DC motor for a torpedo is disclosed. To maintain stability during its course in water to its target, oppositely rotating propellers are beneficial. The design utilizes a stationary stator around which two independent armatures rotate in opposite directions to drive the associated propellers in corresponding opposite directions.

U.S. Pat. No. 4,056,746 presents a counter rotation electric motor that is quite similar to the design present immediately above ('270). Once again a radial commutator/brush design is utilized in the operation of the device. An interesting analysis of the benefits of a counter-rotating motor is presented: 1) increasing the field cutting speed of the armature to increase power output of the motor; 2) minimizing field collapse; and 3) maintaining the angular rate of the armature which is compatible with the containment of the generated centrifugal forces. There is no discussion, suggestion, implication, or teaching that the related motor was more efficient in using less input energy and producing more output work. It is stressed that it has been discovered that the subject invention dramatically increases the efficiency of subject counter-rotating motor.

A DC rotary machine is related in U.S. Pat. No. 4,259,604. The commutator/brush design in this device is very simplistic and is not created to operate at high rotational velocities. Typically, the motor is used in a machine such as a tape recorder, VTR, and the like that need low rotational speeds. The commutator is of standard cylindrical design and the brushes are contacted in a permanent fashion against the commutator bars.

U.S. Pat. No. 4,375,047 presents a torque compensating electrical motor. This device is comprised of two motors, either next to one another in a serial connection or inside one another. The armature is attached to the axle and is utilized for output work. The stator rotates, but is attached to nothing but the supporting bearings, and is spinning to simply eliminate internal torque and not to produce work. The subject invention utilizes both the rotating armature and the rotating stator to generate work. A critical difficulty exists in this patent since the electrical connection are not described or discussed, except to say that the "motor control are well known and do not form part of the present invention" which is simply not a true and valid statement. The figures show only truncated wires coming from the field coils with no details concerning connection to "outside" power and control means. When counter-rotation of motor components is part of the operation of the device the means for electrical communication is critically important and extremely difficult to achieve. Apparently, the reference to "well known" implies some sort of undisclosed brush/commutator configuration (given the 1983 issue date) or a merely theoretical and non-enabled invention was related.

A rotating-field machine is described in U.S. Pat. No. 4,645,963. In this device, which is extremely similar to '047 immediately above, again, the armature is attached to the axle and is utilized for output work. The stator rotates, but is attached to nothing but the supporting bearings, and is spinning to simply rotate the field and not to produce work. Once again, the subject invention utilizes both the rotating armature and the rotating stator to generate work.

U.S. Pat. No. 5,067,932 discloses a dual-input motor in which two armatures rotate either together or in opposite directions within a stationary/fixed outer stator. The stator is rigidly affixed to a suspension member or other stationary anchor.

A dual rotary AC generator is described in U.S. Pat. No. 5,089,734. This disclosure presents, basically, a motor run in reverse, thereby becoming a generator in which both the magnetic field and armature rotate in opposite directions. Unfortunately, the manner in which the device receives or delivers electricity is not related, nor are any internal electrical components described.

U.S. Patent Publication No.: 2006/0163963 discloses a counter rotating generator. Once again, a radially disposed set of disks are utilized in the commutator/brush design. In this case, the slip rings have a relatively large diameter (which is claimed to decrease heat production) and contact brushes in a continual manner, with constant force, regardless of rotational speed. Additionally, the described generator is used in relatively slow RPM situations in which the wind or manual cranking are utilized as the driving forces, unlike the subject invention that may be operated from relatively low to relatively high RPM values.

Disclosed in "Counter-Rotating Permanent Magnet Brushless DC Motor for Underwater Propulsion," J. Qiu et al., IPEMC 2006 is a "theoretical" counter-rotational motor that was discussed via a test-bed that comprised two standard motors that rotated in opposite directions (an "attempt" to mimic a physically real counter-rotational motor). An extremely complex set of Hall Effect Sensors was theorized as being necessary to operate their motor, should an actual motor be fabricated, which did not occur. Additionally, slip-ring connectors were theorized as a means for electrical connections.

A brush-containing motor is related in two generally theoretical papers from Japan. A device labeled as an "Anti-Directional-Twin Rotary Motor" is described that utilizes multiple brushes and slip rings of considerable size to power the outer rotor or as the authors state "the size of the slip ring is not negligible." The analysis of their brush-containing motor presents and relies on many theoretical estimations and adjustments to the very limited data that was recorded. It is of particularly note that "the stator resistance was adjusted so that the theoretical torque-speed curve might fit the measured curve. No comments or comparisons of any sort are made or suggested between their twin-rotor motor and a motor in which one of the rotors is stopped. Clearly, due to the difficulty of actually operating their multi-brush/slip ring motor, much of the presented/plotted data is not actual physical collected data for a twin-rotor motor but "estimated" data from "equivalent" situations. Also, it is plainly stated that the incorporation of the brush/slip ring containing means decreases efficiency by at least 20%. The papers are: "Anti-Directional-Twin-Rotary Motor Drive for Electric Vehicles" by Atsuo Kawamura, et al., page 453, 1994 IEEE (0-7803-1993-1/94 © 1994 IEEE) and "Analysis of Anti-Directional-Twin-Rotary Motor Drive Characteristics for Electric Vehicles" by Atsuo Kawamura, et al., IEEE Transactions on Industrial Electronics, Vol. 44, No. 1, February 1997 (0278-0046/97 © 1997 IEEE).

Finally, a purely "theoretical" brush containing motor with a rotational stator is presented in expired U.S. Pat. No. 6,433,451. On its face, this is a completely non-functional and imaginary invention. This issued patent is, literally, filled with dozens of major errors, including: inconsistent statements; wrong/inappropriate equations; incorrectly and incompletely drawn figures; elements listed as being in the figures and not actually presented in the figures; and mechanically/electrically impossible configurations for the theoretical motor. Brushes are clearly present in both FIGS. 1 and 2, yet the statement "[in FIG. 2] the new points for coupling of the mobile stator coils are 23 and 24" does not correspond to the numbers 23 and 24 being presented in any of the figures. The statement "the proposed motor" plainly indicates a theoretical motor was never constructed since what is shown in the figures would not come close to actually functioning or even being capable of one rotation (as is obvious from the figures, components would physically run into one another upon rotation). Additionally, the "electrical distributor 8" is not defined and the common definition of the term "distributor" presents an incorrect element. Further, the "Formulas Refresher" table presents a somewhat unrelated group of equations that are, mostly, utilized for linear motion and not appropriate in an analysis of rotational motion. Unfortunately, this patent was allowed to issue with all of the gross errors, untrue statements, and incorrect analysis.

BRIEF SUMMARY

An object of the subject invention is to produce a new vehicle or to retro-fit an existing gasoline vehicle with an electric motor to produce a hybrid gas-electric vehicle by incorporating either a traditional motor into the vehicle or an improved electric motor, normally a counter-rotating motor, that accesses torsional forces normally lost to a traditional motor-containing system.

Another objective of the subject invention is to provide a system that produces a new vehicle or retro-fits an existing chemical fuel vehicle with an electric motor to produce a hybrid gas-electric vehicle by incorporating either a traditional motor into the vehicle or an improved counter-rotating electric motor that accesses torsional forces normally lost to traditional stationary motor mounts, usually a motor encircled driveline to couple the electric motor with the chemical fuel engine to power the hybrid vehicle.

Yet a further objective of the subject invention is to manufacture a new vehicle or to retro-fit an existing chemical fuel vehicle with a counter-rotating electric motor that encircles the driveline, thereby producing a hybrid vehicle that utilizes electricity and chemical fuel for power.

Disclosed is relatively inexpensive counter-rotating motor system that may be utilized to produce new vehicle or to modify a traditional gasoline/chemical fuel vehicle into a hybrid chemical fuel-electric vehicle. For the retro-fit embodiment, the subject system's installation is relatively fast and uncomplicated. The result of the subject new or retro-fit embodiments is a major fuel savings created by, essentially, only using the counter-rotating electric motor to power the vehicle (driving at an equilibrium continuous set speed or coasting speeds) at selected speeds (usually slower speeds such as in stop and go traffic such as between red lights and in city-type driving). The subject new or retro-fit hybrid system has gas-saving benefits in daily commuting or city driving conditions since 95% of all driving is city driving. As with current hybrid vehicles, in general, the subject retro-fit hybrid has the ability to capture some of the expended energy (i.e.—whenever a driver is proceeding downhill or decelerating the subject modified vehicle slows down by automatically utilizing the subject motor as a generator and this helps in re-charging the batteries).

The subject hybrid new and retro-fit systems allow the modified vehicle to have a conventional high-horsepower gasoline/chemical fuel engine at the ready, on demand, while allowing the driver to drive the vehicle much of the time with the economical counter-rotating electric motor(s).

More specifically, the subject system comprises a counter-rotating electric motor or motors installed into or next to the vehicle's driveline or differential. When the counter-rotating electric motor system is employed, the counter-rotating power of the armature and the stator are converted/changed into a one directional force. This single direction is accomplished through the use of chain(s), gear(s), belt-drive(s), or the equivalent from of the armature end plus the use of chain(s), gear(s), belt-drive(s), or the equivalent from the stator end and both are connected to one shaft which results in the counter-rotating power being switched into a single directional force. This force is then transferred to the vehicle's drive-train. It is stressed that there is an inherent benefit of an automatic 50% gear reduction with use of the counter-rotating electric motor system (the gear reduction may be varied from 50% by such means as planetary gears that have any desired ratio of gearing and the like).

Further aspects of the invention will be brought out in the following portions of the specification, wherein the detailed description is for the purpose of disclosing fully preferred embodiments of the invention without placing limitations thereon.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

Figure 1:
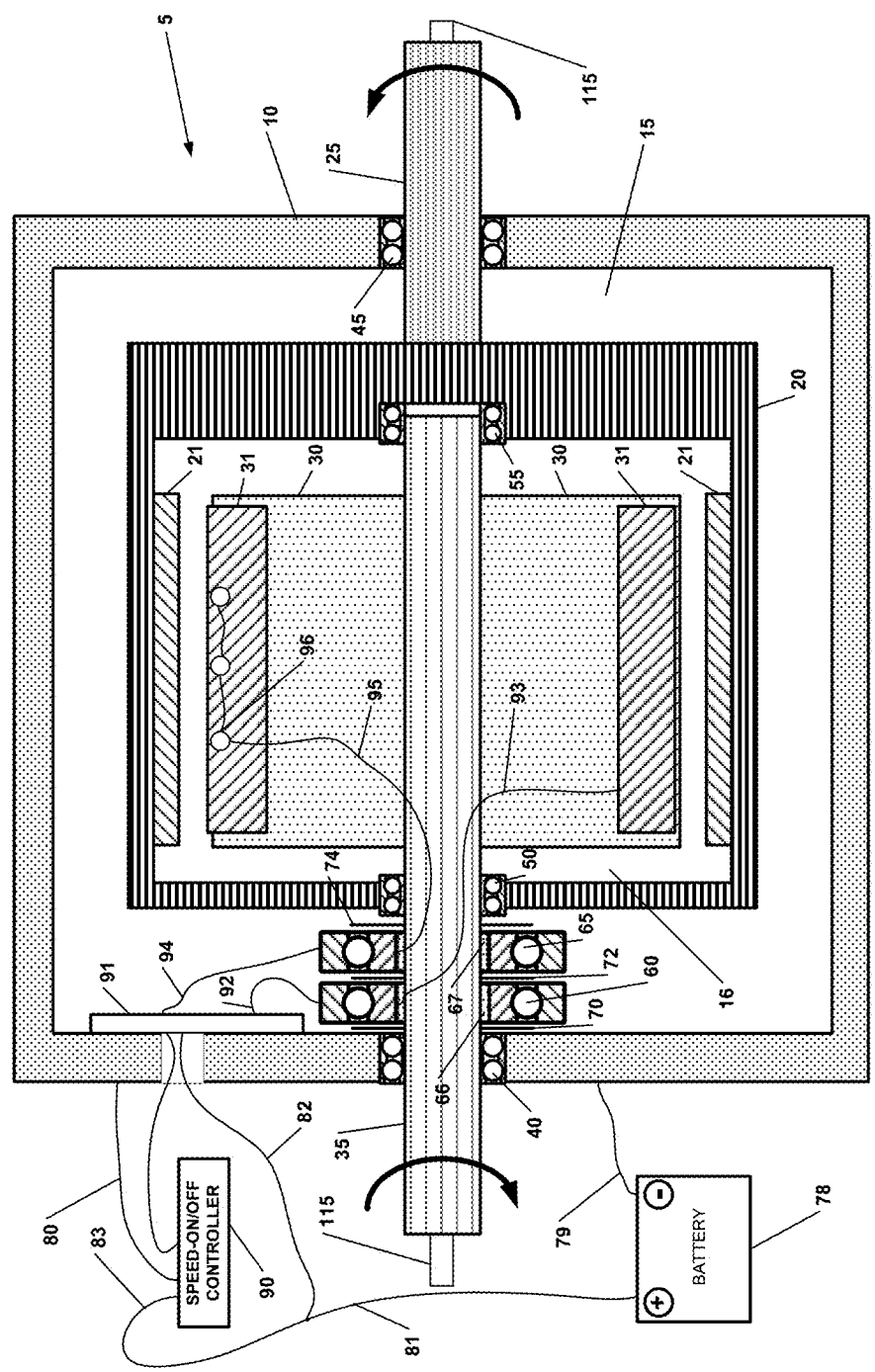
FIG. 1 is a cross-sectional view of an embodiment of the subject counter-rotating motor.

The subject new vehicle and retro-fit vehicle system comprises a counter-rotating electric motor or motors installed into or next to the vehicle's driveline or differential.

For the counter-rotating electric motor system, the counter-rotating power of the armature and the stator are converted/changed into a one directional force. This single direction is accomplished through the use of chain(s), gear(s), belt-drive(s), or the equivalent from of the armature end plus the use of chain(s), gear(s), belt-drive(s), or the equivalent from the stator end and both are connected to one shaft which results in the counter-rotating power being switched into a single directional force. This force is then transferred to the vehicle's drive-train.

The vehicle's accelerator is configured to be a variable speed controller 170 that is employed for 1) the control of the electric motor(s) and 2) the standard chemical fuel control (i.e.—the "gas pedal/accelerator" or the equivalent has two stages in which the first stage controls the electrical power and the second stage controls the standard gas/fuel usage. Clearly, this powering process may be controlled by a computer having the necessary programming to maximize power and fuel consumption. When the accelerator is released (i.e.—no pressure applied) the vehicle is slowed down by the friction created by the electric motor(s) automatically converting itself into a generator for the storage of energy in the vehicle's battery system. This automatic breaking/recharging action recaptures some of the expended electrical energy used from the batteries in driving the vehicle. Usually, a collection/set of batteries is located in various acceptable areas within the vehicle.

Usually, the subject new and retro-fit hybrid vehicle system uses a revolutionary multiple action slip joint driveline (i.e.—usually, the vehicle's standard engine is disengaged from the driveline only when the electric motor(s) is in use and only as long as the electric motor's RPM is kept at a greater RPM than the RPM of the standard chemical fuel engine. Usually, when the standard engine's RPM is increased to the same or greater RPM than the electric motor, only then (using a one way ratcheting effect) does the standard engine's power join in with the electric motor's power (already in use) to increase the vehicles total available power to accelerate the vehicle.

The electric motor can be engaged by mechanical or hydraulic clutch means, electric clutch means, automatic on/off mechanically actuated ratchet action means, and equivalent systems. Reverse direction driving can be accomplished in numerous ways and can use either the electric motor or the standard engine for this power. The vehicle can be reverse engaged by mechanical or hydraulic clutch means, electric clutch, automatic on/off mechanically actuated ratchet action, and equivalent systems.

Usually, the vehicle is left running at idling RPM (approximately ±700) to operate all standard auto equipment (i.e.—power steering, power brakes, lights, heater, air conditioner, and the like). The driver drives/powers the subject vehicle, while using only the electric motor system, by lightly depressing the accelerator/foot feed down to accelerate and releasing it to decelerate the car. When the batteries get too low to drive/power the vehicle properly and if more power or if a short serge of power is desired, then by depressing the accelerator/foot feed down even farther the vehicle will automatically shift from all electric drive into a combination of electric and fuel engine power. This added standard engine power is instantaneously available and used for faster acceleration, for passing, or for high-speed driving.

In reference to FIG. 1, the exemplary subject brushless counter-rotating DC motor 5 includes a protective motor housing 10 that may be fabricated from any suitable material. Within the housing 10 is a separation volume 15 (a similar separation volume 16 is found within the stator 20) in which a stator or outer rotational member 20 is rotationally mounted. A stator axle or stator drive shaft 25 is attached to the stator 20. Secured to the inner lining of the stator 20 are permanent magnets 21 (equivalent electromagnets may take the place of permanent magnets and are considered to be within the realm of this disclosure). It is stressed that in this exemplary device the permanent magnets (or equivalent electromagnets) are associated with the stator or outer rotational member and the field windings are on the armature or inner rotational member, but the permanent magnets may be positioned on the armature and the field windings on the stator or, as stated, electromagnets may substitute for the permanent magnets in either location.

Mounted within the stator 20 is an armature or inner rotational member 30 that is attached to a hollow or channeled armature axle or armature drive shaft 35. Located proximate the outer perimeter of the armature are the windings or electromagnets 31. To permit rotation of both the armature 30 and stator 20 (counter-rotating to one another), suitable bearing assembles are included. It is noted that the utilized bearing assemblies may vary depending on the desired final configuration the counter-rotating motor and all equivalent configurations are considered to be within the realm of this disclosure. Bearing assemblies 40 and 45 are mounted in the housing 10. Bearing assembly 40 permits the armature axle 35 to rotate within the housing 10 and bearing assembly 45 permits the stator axle 25 to rotate with the housing 10. Bearing assemblies 50 and 55 are mounted in the stator 20 and permit the armature 30 and armature axle 35 to rotate within the stator 20.

Since both the armature 30 and stator 20 are rotating in opposite directions when the brushless motor 5 is operating, it is impossible to deliver current to the windings 31 in the traditional manner. Therefore, usually either slip-ring means or electrically conducting grease containing bearings (or equivalent means) are utilized to transfer electrical power and control signals from the outside environment to inside the counter-rotating motor. Thus, for the electrically conducting bearing embodiment (this is exemplary and by way of limitation), one or more insulated bearings 60 and 65 are mounted to and encircle the armature axle 35 (each one carrying a desired electric signal or current). Each bearing 40, 45, 50, 55, 60 and 65 is filled with electrically conducting grease (readily obtainable from numerous public suppliers such as: Cool-Amp Conducto-Lube Company or Engineered Conductive Materials, LLC). Each bearing 60 and 65 is electrically insulated from the armature axle 35, upon which they are mounted, by suitable cylindrical insulators 66 and 67. Additionally, bearing 60 and 65 are electrically insulated from neighboring components by suitable insulators 70, 72, and 74.

Electrical connections for the subject system comprise electrically insulated wiring (traditional metal core and electrically insulating outer coating). Electrical power is supplied by a suitable battery 78 (general power supply that may be coupled to the vehicle generator/alternator and the like), now known or later developed. The battery is grounded to the housing via wire 79, as is the outside controller via wire 80. Usually, power wire 81 runs to a split point and divides into wire 82 and wire 83. Wire 83 continues from wire 81, at the split point, to the outside speed-on/off controller 90. The outside speed-on/off controller 90 is of standard acceptable configuration for activating and inactivating the subject motor and controlling its operational speed. Power wire 82 continues from wire 81, at the split point, through an aperture in the housing 10 and connects with the inside/internal controller 91.

The internal controller 91 transmits and coordinates the necessary electrical power required to operate the armature windings 31 with suitably pulsed current, pulse time detection means (e.g.: methods utilizing Hall Effect sensors, back EMF techniques, and the like), and other desired operations. The internal controller 91 is illustrated as fastened to the interior surface of the housing 10, but other equivalent locations are considered to be with the realm of this disclosure, including attachment to the rotating armature 30 between the bearing 60 and 65 and the windings 31. Various commercial supply companies sell suitable control units 91, including: the "Brushless Motor Cruise Controller—Programmable via PC USB port" and several other acceptable models from the Golden Motor Company of China and doing business in the U.S. (www.goldenmotor.com/).

Power to the windings 31 runs via wire 92 from the internal controller 91 to electrically conducting bearing 60 and then via wire 93, connected to bearing 60 through the associated insulator 66, to the windings 31. Communication between the internal controller 91 and the Hall Effect sensor or sensors 96 (or the equivalent) is by wire 94 to electrically conducting bearing 65 and then via wire 95, connected to bearing 65 through the associated insulator 67, to the sensor(s) 96.

Again, each wire 93 and 95 penetrate the cylindrical insulator 66 and 67, respectively and electrically mate with the electrically conductive parts of each bearing 60 and 65, respectively. The electrically conductive grease permits free rotation of the inner portion of each bearing 60 and 65 while transmitting the electricity to the stationary outer portion of each bearing 60 and 65. The bearings 60 and 65 are electrically connected via wires 92 and 94, respectively, to the internal controller 91.

Extending from each axle 25 and 35 are means 115 for linking the counter-rotating motor into the drive-train in either the driveline or into or proximate the differential that is associated with the driveline.

Figure 2:
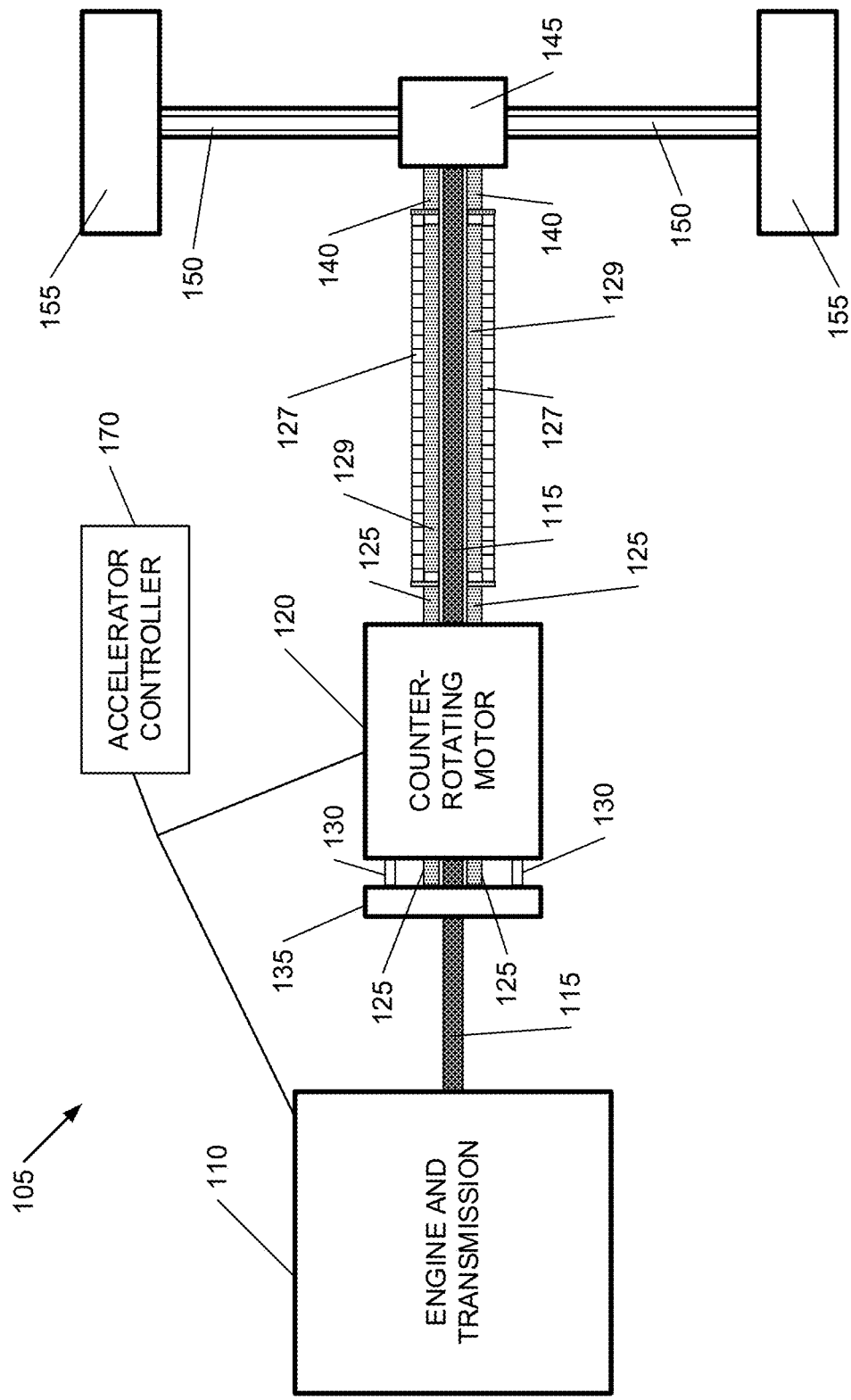
FIG. 2 is a partial cross-sectional view of an embodiment of the subject drive-train adapted system.

FIG. 2 depicts a generalized embodiment of an exemplary counter-rotating motor containing vehicle drive-train 105. The chemical fuel engine and transmission 110 supply the chemical fuel generated power to the system. The driveline 115 exits the engine/transmission 110 and enters the counter-rotating motor 120 and passes through the counter-rotating motor 120. The driveline 115 then continues on to the differential 145 and to the wheels 155.

In the FIG. 2 exemplary depiction, the stator axle 125 extends to the rear of the modified vehicle and the oppositely rotating armature axle 130 extends towards the front of the vehicle. The reversal of the rotation of the armature axle's 130 rotational direction is accomplished via planetary gears 135 which couple the resultant common directional rotation into the stator axle's 125 rotation. The rear-exiting stator axle 125 is now powered by the output of both the rotating stator and armature in the counter-rotating motor 120. The rotating axle 125 then enters a power transferring assembly 127 that links the rotational power from the axle 125 into the differential 145. Usually, the power transferring assembly 127 contains a resilient means 129 (such as a coiled spring or the equivalent) to buffer the transfer of force between the electrically produced force and the chemical fuel produced force. The final transfer of electrically produced force is carried to the differential 145 with drive shaft 140.

A computer controller 170, with appropriate programming, is contemplated as frequently controlling the distribution of power between the counter-rotating motor and the chemical fuel engine. Standard means are utilized to facilitate interfacing the controller with the electro-mechanical components of the subject invention.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. A vehicle drive-train system for creating a chemical fuel-electric powered hybrid vehicle, comprising: (a) a driveline extending from a chemical fuel engine to at least one wheel and (b) a counter-rotating electric motor installed proximate the vehicle's driveline.

2. A vehicle drive-train system according to any preceding or following embodiment, wherein said counter-rotating electric motor is installed into a differential associated with said drive-train.

3. A vehicle drive-train system for creating a chemical fuel-electric powered hybrid vehicle, comprising: (a) a counter-rotating electric motor installed into or next to the vehicle's driveline or differential and (b) an accelerator control means, wherein said accelerator control means comprises a variable speed control that has two stages in which a first stage controls electrical power and a second stage controls chemical fuel usage power.

4. A vehicle drive-train system according to any preceding or following embodiment further comprising an electric power source coupled to said accelerator control means and said counter-rotating electric motor.

5. A vehicle drive-train system according to any preceding or following embodiment, further comprising a counter-rotating motor encircled driveline.

6. A vehicle drive-train system according to any preceding or following embodiment, further comprising a power transferring assembly.

7. A vehicle retro-fit system for converting a chemical fuel vehicle into an chemical fuel-electric powered hybrid vehicle, comprising: (a) a counter-rotating electric motor installed into or next to the vehicle's driveline or differential; (b) an accelerator control means, wherein said accelerator control means comprises a variable speed control that has two stages in which a first stage controls electrical power and a second stage controls chemical fuel usage; and (c) an electric power source coupled to said accelerator control means and said counter-rotating electric motor.

8. A vehicle retro-fit system according to any preceding or following embodiment, further comprising a counter-rotating motor encircled driveline.

9. A vehicle drive-train system according to any preceding or following embodiment, further comprising a power transferring assembly.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A vehicle drive-train system for creating a chemical fuel-electric powered hybrid vehicle, comprising:
   (a) a driveline extending from a chemical fuel engine to at least one wheel and
   (b) a counter-rotating electric motor installed proximate the vehicle's driveline, wherein said counter-rotating electric motor comprises:
      i) a stator axle rotating in one direction and
      ii) an armature axle rotating in an opposite direction to said stator's rotation; and
      iii) planetary gears that reverse the direction said armature axle's rotation to match the rotational direction of said stator axle's rotation, thereby coupling the resultant common directional rotation in to the stator axle's rotation.

2. A vehicle drive-train system according to claim 1, wherein said counter-rotating electric motor is installed into a differential associated with said drive-train.

3. A vehicle drive-train system for creating a chemical fuel-electric powered hybrid vehicle, comprising:
   (a) a counter-rotating electric motor installed into or next to the vehicle's driveline or differential, wherein said counter-rotating electric motor comprises:
      i) a stator axle rotating in one direction and
      ii) an armature axle rotating in an opposite direction to said stator's rotation; and
      iii) planetary gears that reverse the direction said armature axle's rotation to match the rotational direction of said stator axle's rotation, thereby coupling the resultant common directional rotation in to the stator axle's rotation and
   (b) an accelerator control means, wherein said accelerator control means comprises a variable speed control that has two stages in which a first stage controls electrical power and a second stage controls chemical fuel usage power.

4. A vehicle drive-train system according to claim 3, further comprising an electric power source coupled to said accelerator control means and said counter-rotating electric motor.

5. A vehicle drive-train system according to claim 3, further comprising a counter-rotating motor encircled driveline.

6. A vehicle drive-train system according to claim 3, further comprising a power transferring assembly.

7. A vehicle retro-fit system for converting a chemical fuel vehicle into an chemical fuel-electric powered hybrid vehicle, comprising:
   (a) a counter-rotating electric motor installed into or next to the vehicle's driveline or differential, wherein said counter-rotating electric motor comprises:
      i) a stator axle rotating in one direction and
      ii) an armature axle rotating in an opposite direction to said stator's rotation; and
      iii) planetary gears that reverse the direction said armature axle's rotation to match the rotational direction of said stator axle's rotation, thereby coupling the resultant common directional rotation in to the stator axle's rotation;
   (b) an accelerator control means, wherein said accelerator control means comprises a variable speed control that has two stages in which a first stage controls electrical power and a second stage controls chemical fuel usage; and
   (c) an electric power source coupled to said accelerator control means and said counter-rotating electric motor.

8. A vehicle retro-fit system according to claim 7, further comprising a counter-rotating motor encircled driveline.

9. A vehicle retro-fit system according to claim 7, further comprising a power transferring assembly.

\* \* \* \* \*